(12) United States Patent
Henty (10) Patent No.: US 9,069,387 B2
(45) Date of Patent: Jun. 30, 2015

(54) INPUT DEVICE EMPLOYING BACKSCATTER TRANSMISSION

(75) Inventor: David L. Henty, Irvine, CA (US)

(73) Assignee: EZERO TECHNOLOGIES LLC, Irvine, CA (US)

( * ) Notice: Subject to any disclaimer, the term of this patent is extended or adjusted under 35 U.S.C. 154(b) by 1962 days.

(21) Appl. No.: 11/304,833

(22) Filed: Dec. 15, 2005

(65) Prior Publication Data

US 2006/0114129 A1    Jun. 1, 2006

Related U.S. Application Data

(62) Division of application No. 09/978,615, filed on Oct. 16, 2001, now Pat. No. 7,006,014.

(60) Provisional application No. 60/241,178, filed on Oct. 17, 2000, provisional application No. 60/244,611, filed on Nov. 1, 2000, provisional application No. 60/257,479, filed on Dec. 21, 2000.

(51) Int. Cl.
*H03M 11/00* (2006.01)
*G06F 3/02* (2006.01)
*G06F 3/023* (2006.01)

(52) U.S. Cl.
CPC ............ *G06F 3/0202* (2013.01); *G06F 3/0231* (2013.01)

(58) Field of Classification Search
CPC .............................. G06F 3/0202; G06F 3/0231
USPC .................. 341/22, 173, 20; 340/10.2, 572.7, 340/572.1, 825.56, 825.69, 825.72; 345/168, 171, 172
See application file for complete search history.

(56) References Cited

U.S. PATENT DOCUMENTS

| | | | | |
|---|---|---|---|---|
| 5,142,270 | A * | 8/1992 | Appalucci et al. | 340/572.3 |
| 5,257,009 | A * | 10/1993 | Narlow | 340/572.3 |
| 5,781,110 | A * | 7/1998 | Habeger et al. | 340/572.5 |
| 6,133,833 | A * | 10/2000 | Sidlauskas et al. | 340/572.1 |
| 6,243,012 | B1 * | 6/2001 | Shober et al. | 340/572.7 |
| 6,373,469 | B1 * | 4/2002 | Chen | 345/163 |
| 6,650,254 | B1 * | 11/2003 | Rix | 341/22 |
| 7,006,014 | B1 * | 2/2006 | Henty | 341/22 |
| 7,525,453 | B2 * | 4/2009 | Henty | 341/22 |

OTHER PUBLICATIONS

Boardless IBM TDB, Mar. 1, 1990.*

* cited by examiner

*Primary Examiner* — Albert Wong (57) ABSTRACT

A wireless keyboard and reader combination comprises a keyboard having a plurality of keys, an antenna, and a plurality of passive transponder circuits coupled to the antenna and associated with the keys. The passive transponder circuits are selectively coupled to receive power from the antenna and provide a coded response identifying a key in response to key activation. An associated reader includes a source of an interrogating field applied to the antenna of the keyboard and a decoder for determining the coded response from the passive transponder circuits.

8 Claims, 11 Drawing Sheets

INPUT DEVICE EMPLOYING BACKSCATTER TRANSMISSION

RELATED APPLICATION INFORMATION

The present application is a divisional application of U.S. Ser. No. 09/978,615 filed Oct. 16, 2001 now U.S. Pat. No. 7,006,014 which claims the benefit pursuant to 35 USC §119 (e) of the priority date of U.S. Provisional Patent Application Ser. No. 60/241,178, filed on Oct. 17, 2000, U.S. Provisional Patent Application Ser. No. 60/244,611, filed on Nov. 1, 2000 and U.S. Provisional Patent Application Ser. No. 60/257,479, filed on Dec. 21, 2000, the entire contents of which are hereby expressly incorporated herein by reference.

BACKGROUND OF THE INVENTION

1. Field of the Invention

The present invention relates to wireless keyboards and computer systems employing wireless keyboards. The present invention further relates to methods of wireless text input to computer systems.

2. Description of the Prior Art and Related Information

Wireless keyboards have a number of advantages over the more common wire connected keyboards employed in computer systems. First of all, wireless keyboards offer more flexibility to the user to position him or her self relative to the computer. This can reduce strain and tiredness associated with computer use. Also, wireless keyboards reduce the amount of wires connected over or around a desktop and reduce clutter and complicated wiring tangles. This also creates a cleaner look to the overall system and can give the computer system a more sophisticated and/or expensive look. This avoidance of wiring becomes increasingly significant as more add on peripherals are included in typical computer systems which can result in workplace clutter.

The wireless keyboards currently available are either infrared based or RF based transmission systems. The infrared systems are the simplest and least expensive, however, they require a line of sight to the receiver. This can result in inconsistent transmission as the keyboard is moved or if other objects block the transmission path. RF systems do not suffer from this problem but are more expensive than infrared systems. In particular, the reliability of transmission in RF systems at a given range depends on the RF frequency and the power and quality of the transmitter. Therefore, maintaining transmission reliability requires more expensive higher frequency transmitters and/or higher power transmitters. Nonetheless, RF systems are increasingly being used for wireless keyboards over infrared systems due to their performance advantages.

Undoubtedly the primary reason that wireless keyboards have not displaced wire connected keyboards to a greater extent is the need for replacing batteries. When batteries fail in a wireless keyboard computer system the system is useless until the batteries are replaced. This is obviously a significant inconvenience when the battery failure is not expected. Also, keyboards typically continuously scan the matrix of keys to detect key depression. Therefore, even when there is no data entry from the keyboard battery power is being used for key scanning. Therefore, battery lifetime is inherently limited in wireless keyboards.

As a result of these limitations wireless keyboards have not been able to fulfill the potential of replacing wired keyboards in computer systems.

SUMMARY OF THE INVENTION

In a first aspect the present invention provides a wireless keyboard and reader combination which comprises a keyboard having a plurality of keys, an antenna, and a plurality of passive transponder circuits coupled to the antenna and associated with the keys. The passive transponder circuits are selectively coupled to receive power from the antenna and provide a coded response identifying a key in response to key activation. An associated reader includes a source of an interrogating field applied to the antenna of the keyboard and a decoder for determining the coded response from the passive transponder circuits.

In another aspect the present invention provides a computer system, comprising a monitor, a processor and a keyboard having a plurality of keys, including a plurality of text entry keys and plural multi-function keys which may be activated simultaneously during normal keyboard operation. The keyboard further includes an antenna, and one or more passive transponder circuits coupled to the antenna and associated with the keys and selectively coupled to receive power from the antenna and provide a coded response identifying a key in response to key activation. Means are provided for preventing interference between simultaneously activated keys. The computer system further comprises a reader including a source of an interrogating field applied to the antenna of the keyboard and a decoder for determining the coded response from the passive transponder circuits.

In another aspect the present invention provides a method for wireless transmission of data between a keyboard having a plurality of keys and a reader. The method comprises providing an interrogating field from the reader to the keyboard and receiving power from the interrogating field at an antenna configured in the keyboard. The method further comprises modulating a return Further features and aspects of the invention are also provided as will be appreciated from the following detailed description of the invention.

DETAILED DESCRIPTION OF THE INVENTION

Figure 1:
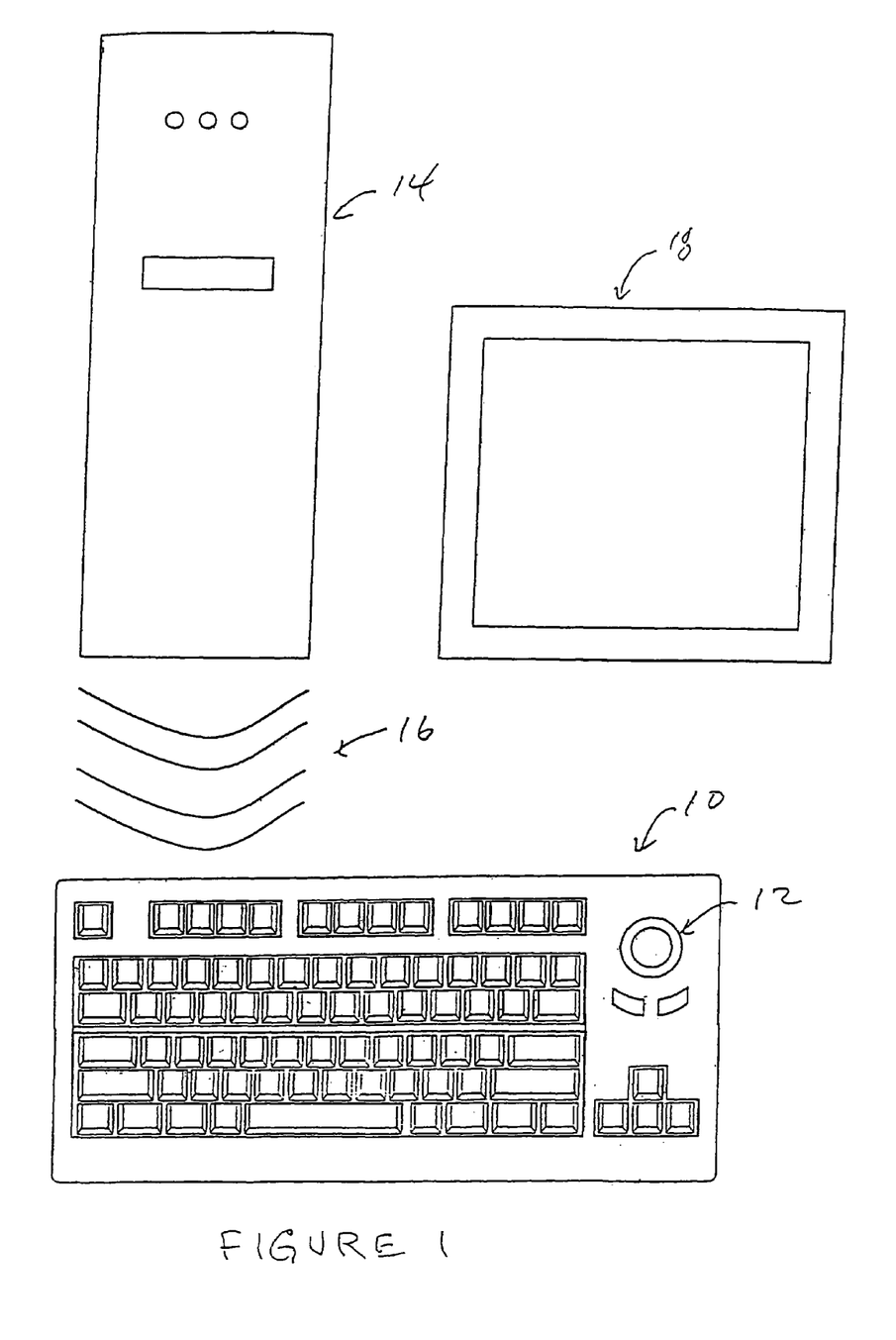
FIG. 1 is a drawing of a computer system with a passive wireless keyboard in accordance with the present invention.

Referring to FIG. 1, a computer system incorporating a passive wireless keyboard 10 and a passive mouse 12 is illustrated. Keyboard 10 may be a QWERTY keyboard of an integral one piece conventional construction or may incorporate a folding design such as disclosed in U.S. Pat. No. 6,094,156 the disclosure of which is incorporated herein by reference in its entirety. The computer system as illustrated also includes a housing 14 which includes the processor, hard disk drive, and other components in a conventional computer system, as well as a reader unit which is the source of an interrogating field 16 which is used to interrogate the passive keyboard 10 and passive mouse 12. The computer system also includes a monitor 18 which may be a CRT or LCD type of display or other display known in the computer art. Interrogating field 16 is an RF modulated field generated by the reader and applied to a suitable antenna, contained within housing 14. Optionally the reader and/or the antenna may be contained within monitor 18. Alternatively, the reader may be incorporated in an add-on unit which interfaces with the computer housing 14 through an available port, such as a USB port, or the keyboard input.

Each key in keyboard 10 includes a passive transponder which receives energy from the interrogating field 16 and when activated provides a coded response to the reader which indicates the key activated. Suitable passive transponders are known and typically include an antenna and integrated circuit which may be combined in a small package and provided at a relatively low-cost. The antenna is used by the passive transponder to receive energy from the interrogating field which energy is used by the transponder to provide the coded response to the interrogating signal. The activation of a key in the keyboard 10 closes a switch that connects the transponder IC corresponding to that key to its antenna thereby allowing it to receive energy from the interrogating field 16 and provide a coded response to the reader in the computer housing 14. Each transponder corresponding to a given key in the keyboard 10 has a unique code identifying the key which is read by the reader and thus provides an identification of the specific key activation to the computer processor.

Passive transponder tags as well as readers suitable for energizing and reading the response from such tags are well known and commercially available from a number of sources. The most common transponder tags and readers employ either inductive coupling or electrostatic coupling between the reader and tag. Examples of passive ID tags and readers of both inductive and electrostatic designs which may suitably be employed in the present invention are described in the following United States patents; U.S. Pat. No. 6,040,773 to Vega, et al., U.S. Pat. No. 5,446,447 to Carney et al., U.S. Pat. No. 6,107,920 to Eberhardt et al., U.S. Pat. No. 6,100,804 to Brady et al., U.S. Pat. No. 6,072,383 to Gallagher et al., U.S. Pat. No. 4,730,188 to Milheiser, and U.S. Pat. No. 5,430,441 to Bickley, et al., the disclosures of which are incorporated herein by reference in their entirety.

Figure 2:
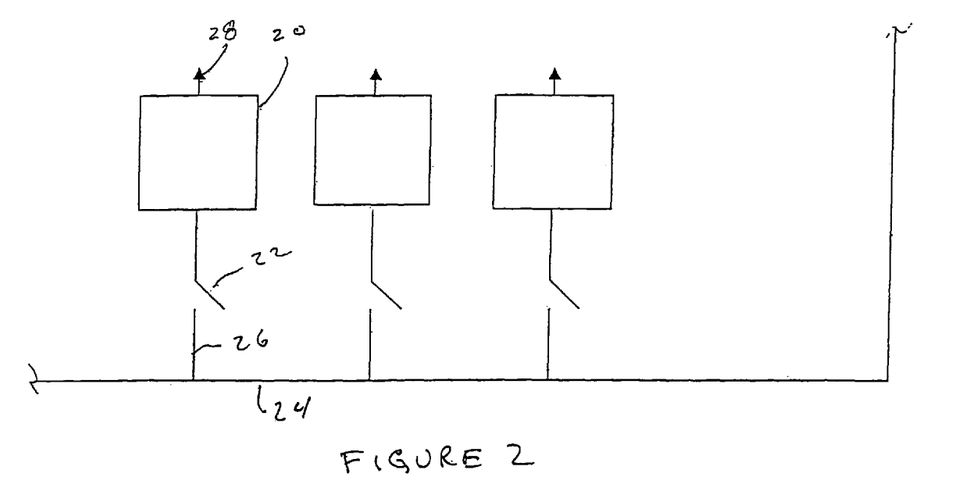
FIG. 2 is a cutaway view of the wireless keyboard of FIG. 1 illustrating the transponder ID tags and antenna employed in the keyboard.

Referring to FIG. 2 a portion of keyboard 10 is illustrated showing a portion of an array of passive transponder ID tags 20. Specifics of the design of tags 20 may be found in the above noted United States patents. Each ID tag 20 comprises an integrated circuit chip storing a unique code for the specific key of the keyboard 10 to which the tag 20 corresponds. Also as shown each tag 20 is coupled via a switch 22 to an antenna 24. When a key is activated by the keyboard user the depression of the key closes switch 22 thereby coupling the individual ID tag 20 to the antenna 24. This allows the tag to collect power from the interrogating field and respond with its unique code to the reader. Each tag 20 may have its own antenna. As antenna size can limit read range, however, it is generally desirable to have as large an antenna as possible associated with each tag. As illustrated in FIG. 2, this may be achieved by providing a common antenna to which is coupled a plurality of individual tags 20. This allows an antenna 24 to be dimensioned substantially the entire size of the keyboard which can provide substantial increases in coupling to the interrogating field and corresponding increases in the read distance and read integrity. Although the antenna 24 is illustrated as a simple line antenna 24 it will be appreciated that where electrostatic coupling is employed a planar antenna design may be preferred whereas in the case of inductive coupling a coil antenna design may be preferred. Planar and coil antenna designs suitable for relatively large areas such as the common keyboard antenna are disclosed in the above-noted '920 and '447 patents, respectively. In the case of a large common antenna, especially of a coil or planar design, the antenna 24 may be formed on a separate layer of the keyboard from the tags 20 with a connection 26 provided between the antenna layer and the layer on which the tag ICs 20 are formed.

Figure 3:
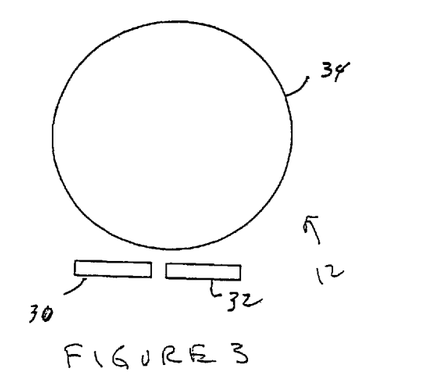
FIG. 3 is a perspective view of a wireless mouse employed in one embodiment of the computer system of FIG. 1.

Referring to FIG. 3, an implementation of a passive mouse 12 is illustrated. Passive mouse 12 includes passive transponder tags 30 and 32 configured adjacent the perimeter of the mouse ball 34 comprising a body portion of the mouse. Passive transponder tags 30, 32 are tuned so they respond to a particular interrogating frequency. Such tuning of tags to a specific interrogating frequency is known in the art, see for example the '447 patent and '383 patent. Preferably the tags are responsive to different interrogating frequencies and are tuned such that presence of a conductive, inductive or magnetic repeating pattern coating the surface of the mouse ball 34 will cause the tag circuit to be activated (or deactivated) only when pattern portions are positioned over the tag. For example the pattern could be coated on the inside of the mouse ball 34. An oriented antenna design, inductive coupling pattern or capacitor pattern are provided in tags 30, 32 chosen so that the tuning and activation of one tag is provided by the vertical motion of mouse ball 34 whereas the other tag will be affected by the horizontal ball motion. Therefore, as the mouse ball 34 is rotated the two tags will be tuned and detuned repeatedly with a duty cycle which corresponds to the velocity of the rotating mouse ball 34. This thus provides two components of the rotational motion of the mouse ball which can be used to provide the specific speed and direction of the mouse ball 34. This in turn can be used to accurately track mouse ball position to provide conventional mouse control functions. Additional tags with varying orientations may be provided to increase angular direction sensitivity. Alternatively mouse position can be encoded directly in the frequency of the tags as their tuning shifts frequency in response to the pattern on the mouse ball with a swept frequency read signal provided from the reader, i.e., each position corresponds to a unique frequency of tag 30 and tag 32 which is detected by the reader.

Figure 4:
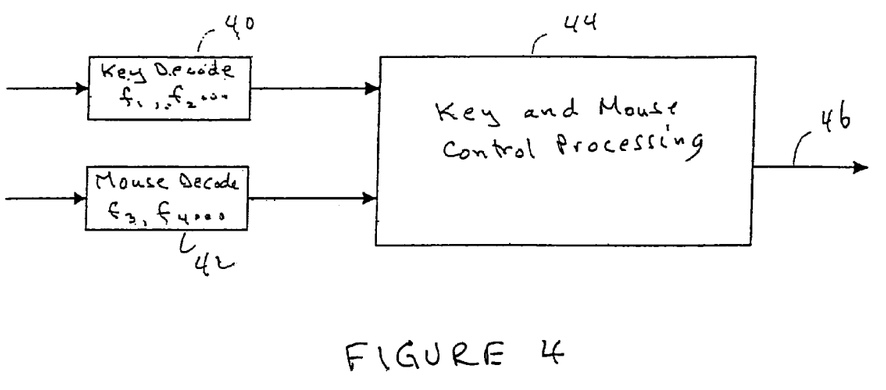
FIG. 4 is a block diagram of the tag reader electronics employed in the computer system of FIG. 1.

Referring to FIG. 4 a reader block diagram is illustrated. As noted above reader designs are known and are described in the above patents and need not be described in detail herein; however, FIG. 4 illustrates aspects of the reader adapted for the present application. As shown the reader includes a key reader and decoder 40 and mouse reader and decoder 42. These may each be operable at plural frequencies f1-fn. Plural frequencies for the key reader may prevent interference from simultaneously operated keys and may be limited to commonly activated keys such as ctrl, shift, alt, etc. Mouse decoder in turn may use plural frequencies as described above. Frequency isolation by a reader is disclosed in the '447 patent and the reader of FIG. 4 and decoders 40, 42 may incorporate features of, e.g., FIG. 14 of the '447 patent for frequency isolation and decoding. Other techniques for preventing interference from multiple tags being read simultaneously are known and may be employed instead of assigning unique frequencies to the commonly activated tags. For example, a protocol where a tag issues a brief response in a unique time slot or where a random response timing is used can minimize inter-tag interference without separate frequencies.

The decoded key and mouse information is provided to control processing circuit 44 which converts the decoded information to conventionally formatted key and mouse control data which is provided to the computer processor on line 46. Some or all of the functions of circuit 44 (as well as some functions of decoders 40, 42) may be provided in the computer processor, however, and this may provide cost advantages.

Next a number of detailed embodiments of the invention will be described employing the above teachings of the invention.

Figure 5:
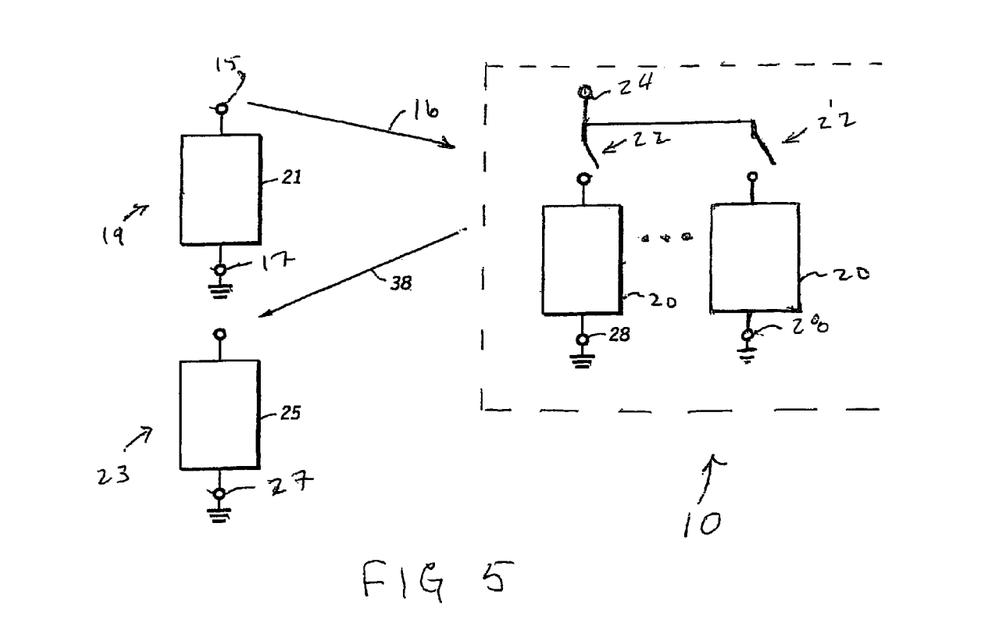
FIG. 5 and FIG. 6 are block schematic diagrams illustrating a specific embodiment employing electrostatic tags and reader.
Figure 6:
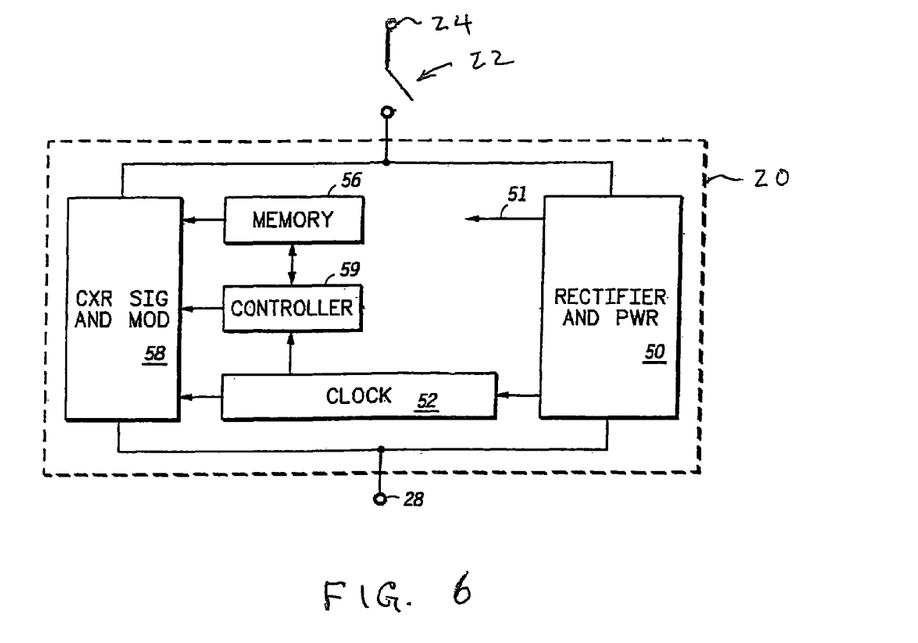

With reference to FIG. 5 and FIG. 6, a specific embodiment employing electrostatic tags and reader, e.g., as described in the '773 patent is illustrated. Referring first to FIG. 5, the illustrated embodiment includes: 1) a source of an interrogating field 16 in the form of electrostatic exciter 19, 2) a proximately-located electrostatic reader 23, and 3) a keyboard 10 having a plurality of radio frequency identification tags 20. Electrostatic exciter 19 includes an exciter common electrode 17 and an exciter antenna element 15 coupled to an exciter circuit 21. Electrostatic reader 23 includes a reader common electrode 27 and a reader antenna element 29 coupled to a reader circuit 25. Keyboard 10 includes a plurality of tags 20 coupled between electrode 28 and common tag antenna element 24. In the preferred implementation of the invention shown, exciter common electrode 17, reader common electrode 27 and tag common electrode 28 are coupled to ground.

Electrostatic exciter 19 provides an exciter signal 16. When radio frequency identification tag 20 is proximate electrostatic exciter 19, exciter signal 16 is electrostatically coupled, through the air, from exciter antenna element 15 to tag antenna element 24. Radio frequency identification tag 20 becomes energized based upon exciter signal 16. In accordance with the tag circuit 20 and stored tag information of radio frequency identification tag 20, radio frequency identification tag 20 generates a read signal 38 containing some or all of the stored tag information, which is communicated from tag circuit 20 to tag antenna element 24. Read signal 38 is electrostatically coupled from tag antenna element 24 to reader antenna element 29. Electrostatic reader 23 receives read signal 38, demodulates/decodes read signal 38 to recover the stored tag information therefrom and, as appropriate, communicates the stored tag information to other system elements (not shown). In a preferred implementation, read signal 38 is a reflected signal modulated by means of reflected load modulation based upon the stored tag information. It will be appreciated that other forms of modulation such as amplitude modulation (AM), frequency modulation (FM) or phase modulation (PM) may be used to convey the stored tag identification.

Electrostatic exciter 19 may be advantageously constructed from available tag exciter circuitry, such as for example, Motorola Indala's ASR-120 base station (part no. 05200-006 available from Motorola Indala Corporation, 3041 Orchard Parkway, San Jose, Calif. 95134). The ASR-120 device is adapted by forming and coupling a suitable exciter electrode, for example a copper plate electrode, to one of the dipole electrode connections thereby forming the exciter antenna element 15. The other dipole electrode connection is coupled to earth thereby forming exciter common electrode 17. As the ASR-120 is also adaptable to receive from a radio frequency identification tag the read signal, one will appreciate that it may be further adapted to include the reader antenna element coupled to the read electrode connection.

Referring now to FIG. 6, one embodiment of tag 20, employing the teachings described in the above noted '773 patent, is shown. As shown tag circuit 20 includes operatively coupled: 1) a rectifier and tag power circuit 50, 2) a clock circuit 52, 3) a memory 56, 4) a carrier signal and/or modulator circuit 58 and 5) a controller 59. More particularly, tag antenna element 24 is coupled to both rectifier and tag power circuit 50 and to carrier signal and/or modulator circuit 58, which in turn are respectfully coupled to tag common electrode 28. Rectifier and tag power circuit 50 receives an exciter signal via tag antenna element 24 and provides a direct current (dc) power supply 51. The exciter signal 34 is further coupled via rectifier and tag power circuit 50 to clock circuit 52. Clock circuit 52 provides a clock signal to each of carrier signal and/or modulator circuit 58 and controller 59. Memory 56 retains the stored tag information and is accessed by controller 59 and carrier signal and/or modulator 58. Upon excitation, via closing of switch 22 in response to a key activation, carrier signal and/or modulator circuit 58 generates a read signal with the appropriate modulation and couples it to tag antenna element 24. The read signal may be a reflected signal modulated via load modulation. It will be appreciated, however, that other modulations, such as amplitude modulation (AM), frequency modulation (FM) and phase modulation (PM) may be used to convey the stored tag information. In one embodiment, the Indala 1341 circuit chip available from Motorola Indala Corporation may be used. Tag common electrode 28 is arranged to couple to ground.

Figure 7A:
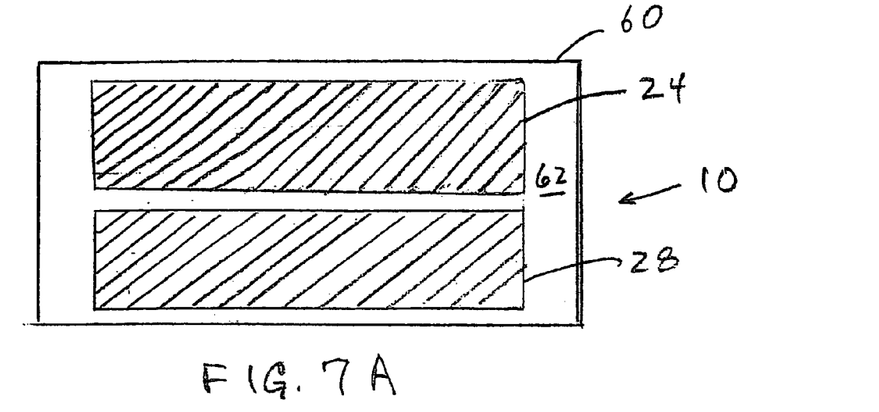
FIGS. 7A and 7B are top views and FIG. 7C is a side cutaway view of sections of a keyboard employing a planar antenna design adapted for an electrostatic tag and reader embodiment.
Figure 7B:
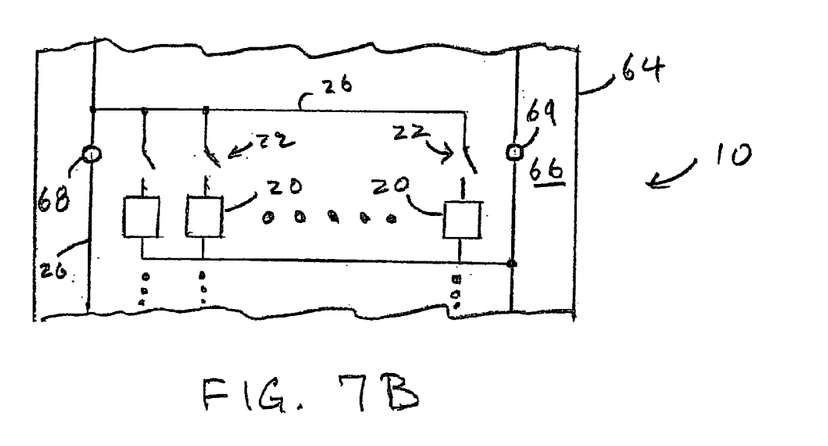
Figure 7C:
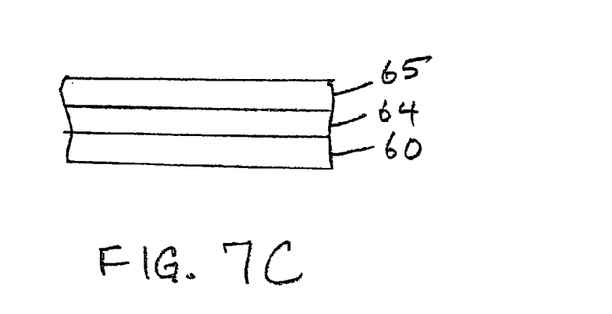
Figure 8:
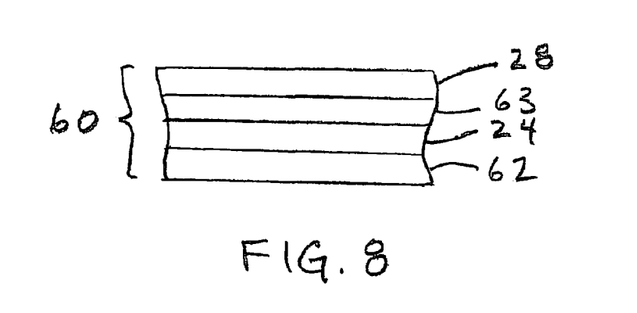
FIG. 8 is a side cutaway view of an alternate planar antenna design.

FIGS. 7A and 7B are top views of sections of a keyboard 10 employing a planar antenna design adapted for an electrostatic tag and reader embodiment. Referring first to FIG. 7A, a layer 60 of keyboard 10 is illustrated employing a planar antenna pattern thereon, for example, such as described in more detail in the above noted '920 patent, the disclosure of which is incorporated herein by reference. The generally planar tag antenna 24, as well as common ground antenna 28, may be formed of a suitable conductive material on top of a nonconductive substrate 62, which may be configured on the keyboard housing or part of the housing. The planar pattern may be generally split across the keyboard into vertically separated antennas 24 and 28 as illustrated, or a horizontal configuration may be employed. Other configurations are also possible, including one antenna layer on top of the other, separated by a dielectric layer 63 as illustrated in FIG. 8. The antenna configuration will be chosen for the specific implementation to maximize electrostatic coupling to the reader based on the intended positioning of the reader and orientation of the keyboard. Referring to FIG. 7B, a top view of a second layer 64 of keyboard 10 is illustrated which comprises tags 20 and switches 22 connected to the tag antenna by connection 26, as described in relation to FIG. 2 above. Layer 64 may be configured on top of layer 60 as illustrated in FIG. 7C and connection 26 may connect to antenna 24 through conductive via 68. Similarly, connection to common ground antenna may be made through via 69. Tags 20, switches 22 and connection 26 may be formed on a suitable substrate 66. Layer 65 with the keys thereon (shown in FIG. 1) is configured on top of layer 64 with the keys aligned with switches 22.

Figure 9:
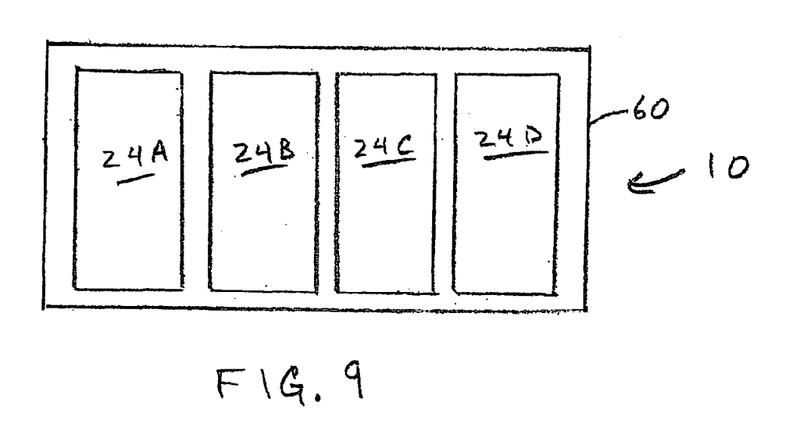
FIGS. 9 and 10 are top views of an embodiment of a tag antenna with separate antennas provided for different groups of keys.
Figure 10:
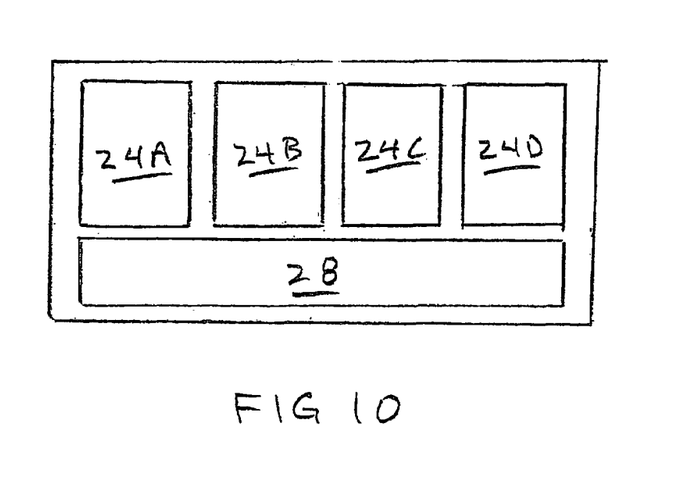

Referring to FIG. 9, an embodiment of tag antenna 24 is illustrated with separate antennas 24A, 24B, 24C and 24D provided for different groups of keys. The number of separate antennas provided may be chosen to reduce or eliminate the possibility of simultaneously activated keys sharing an antenna during normal keyboard usage. This may reduce interference in the read operation between such simultaneously activated keys. For example, for a typical computer keyboard with CTRL, ALT and SHIFT keys adapted for use together with other keys, these may each be coupled to a separate antenna 24, e.g., 24A, 24B, 24C, respectively. Antenna 24D could then couple to the remaining keys, including all the text keys. Additional or fewer antennas may be provided for specific keyboard functionality. Preferably, the antennas in total exploit substantially all of the keyboard area to maximize read range as generally illustrated in FIG. 9. Either planar or coil type antennas may be provided. For electrostatic coupling a common ground antenna 28 may be provided as shown in FIG. 10.

Figure 11:
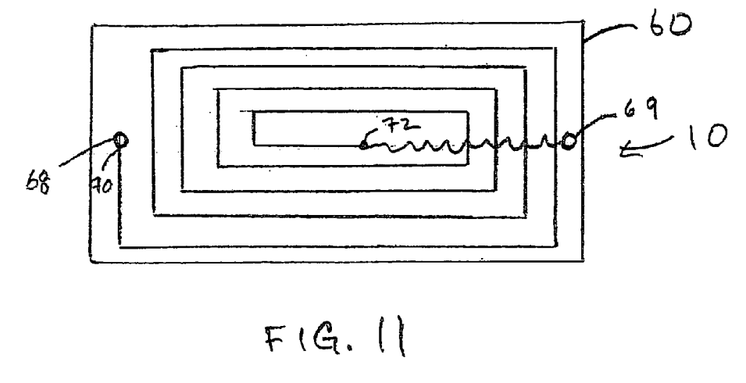
FIG. 11 is a top view of an embodiment of a tag antenna design employing a flat antenna coil design adapted for an inductive tag and reader embodiment.

FIG. 11 is a top view of an embodiment of a tag antenna design employing a flat antenna coil design adapted for an inductive tag and reader embodiment. A simple wire coil antenna about the perimeter of keyboard 10, or in sections thereof as shown in FIG. 9 may be the most cost effective design for many such applications. However, the flat design of FIG. 11 may have advantages for automated manufacture and/or the most effective use of the coil conductor material. The illustrated flat antenna coil design may generally employ the teachings of the above noted '447 patent, the disclosure of which is incorporated herein by reference. The illustrated flat antenna coil design may comprise a flat spiral coil 24, of a suitable conductive material, covering substantially all of the surface area of keyboard 10 or covering the keyboard in sections as shown in FIG. 9. Taps 70 and 72 are coupled to tags in an upper layer 64 through conductive vias 68 and 69, as described above in relation to FIGS. 7B and 7C.

Figure 12:
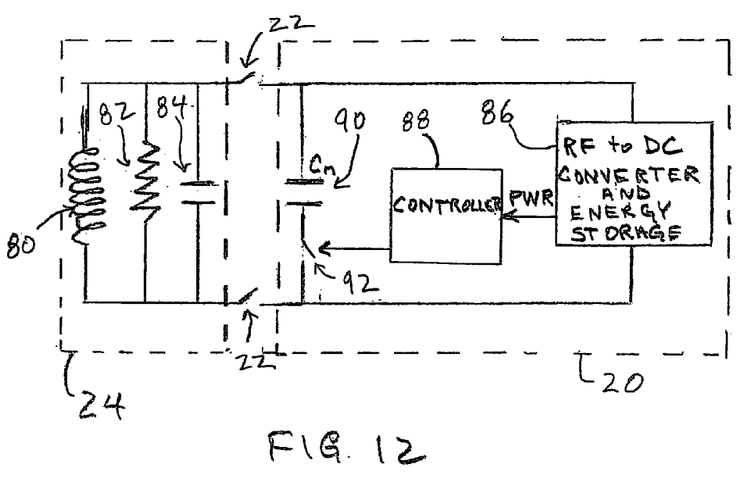
FIG. 12 is a block schematic diagram of a specific embodiment of the tag adapted for an inductive tag and reader embodiment.

FIG. 12 is a block schematic diagram of a specific embodiment of the tag adapted for an inductive tag and reader embodiment. As illustrated, tag antenna 24 includes an inductor 80 and has an associated reactance illustrated as resistor 82 and capacitor 84. The tag antenna 24 is coupled to tag 20 via switch 22 which is activated by a key on keyboard 10, as discussed above in relation to FIG. 2. To more completely isolate the circuit of tag 20 from the antenna when the key is not activated, the switch 22 may also decouple the second tap of the inductor 80, as shown. Tag 20 includes a rectifier and power supply circuit (RF to DC converter and energy storage circuit) 86 which supplies power to controller 88, which includes a memory storing the unique code for the key. Capacitor 90 has a capacitance Cn which tunes the tag to resonate at a desired frequency fn. When the tag receives power in response to switch 22 closing, controller 88 modulates switch 92 to encode the data for the unique key code. The modulation may take the form of coupling and decoupling the capacitor 90 to tune and detune the circuit at a high rate. Alternatively, the switch 92 may take the form of a varactor and controller 88 may control the capacitance thereof to modulate the resonant frequency of the tag to encode the tag code, as described in the '447 patent (see, e.g., FIG. 16 thereof). Any other known modulation technique may also be employed. Also, as known in the art backscatter or reader load modulation may be employed to transmit the data to the reader.

Figure 13:
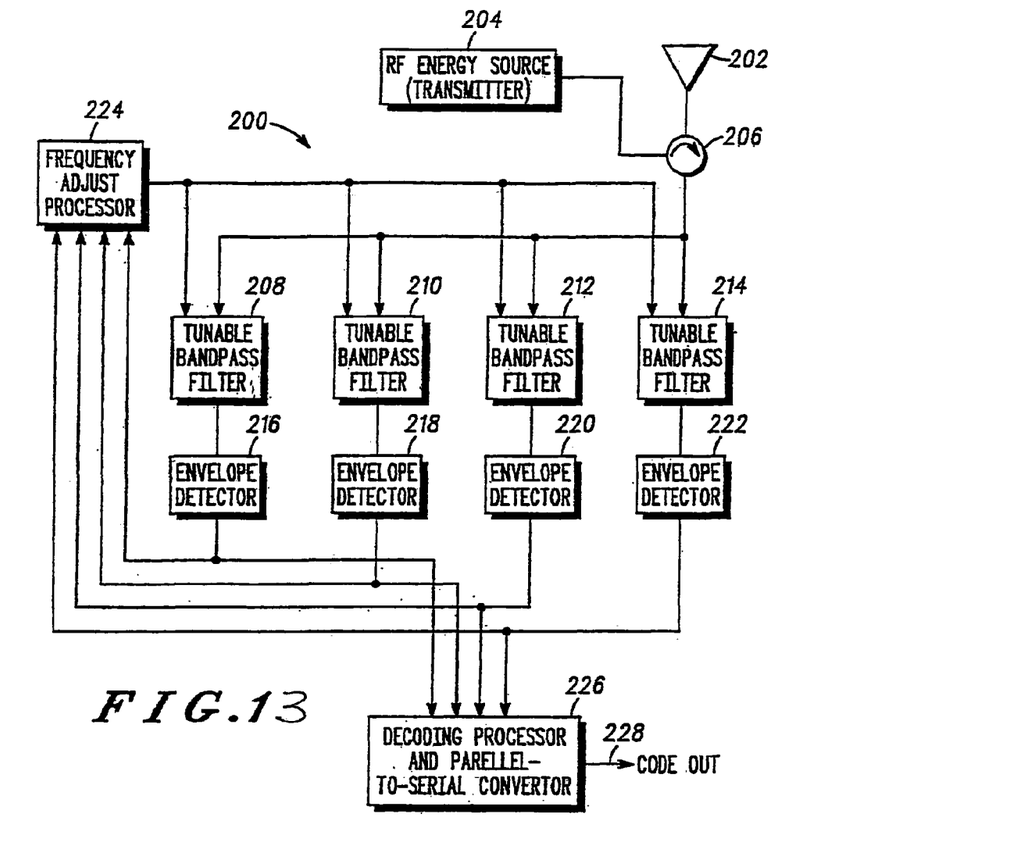
FIG. 13 is a block schematic diagram of a specific embodiment of a reader adapted for a multi-frequency tag embodiment.

The capacitance Cn of capacitor 90 may be varied for some or all of the tags to vary the resonant frequency of the tags. For example, each multi-function key or other key used simultaneously with other keys during normal keyboard operation may be given a different resonant frequency fn as described above. The different resonant frequency fn is provided by a unique capacitance Cn. For example, four unique frequencies f1-f4 may be provided by capacitances C1-C4, corresponding to Ctrl, Alt, Shift and text keys in a conventional QWERTY type keyboard adapted for computer control. FIG. 13 is a block schematic diagram of a specific embodiment of a reader adapted for a multi-frequency tag embodiment. To prevent detuning each of the separate frequency tags may also be coupled to a separate antenna 24 as described in relation to FIG. 9, above.

Referring to FIG. 13, a conventional multi-frequency tag reader is illustrated, in particular corresponding to FIG. 14 of the '447 patent incorporated herein by reference. Accordingly a detailed discussion is not necessary. The operation of the illustrated reader will be modified, however, in accordance with the present teachings to provide the desired tag discrimination/anticollision. Referring to FIG. 13, the reader 200 includes an antenna 202, an RF energy transmitter 204, a circulator 206, and a plurality of tunable band pass filters 208, 210, 212, and 214. The reader 200 further includes a plurality of envelope detectors 216, 218, 220, and 222, a frequency adjust processor 224, and a decoding means 226. The RF transmitter 204 may be a sweep transmitter which continuously sweeps through all of the frequencies to which the resonant circuits of the RF tags may be resonant. Alternatively, the RF transmitter may be a stepped frequency transmitter which incrementally steps through all of the resonant frequencies to which the resonant circuits of the RF tags may be resonant. As a further alternative, the RF transmitter may be of the known type which simultaneously transmits at all of the frequencies to which the resonant circuits of the RF tags may be resonant. The circulator 206 permits the RF energy from the transmitter 204 to be radiated from the antenna 202 while precluding the RF energy from the RF transmitter 204 from reaching the other components of the reader 200 such as the tunable band pass filters and the envelope detectors.

As illustrated, four tunable band pass filters and four envelope detectors are illustrated to permit the recovery of an identification code of simultaneously operated RF tags which have resonant circuits resonant at four different frequencies f1-f4, as described above. Each of the tunable band pass filters 208, 210, 212, and 214 are coupled to the antenna 202 through the circulator 206 and to a respective one of the envelope detectors 216, 218, 220, and 222. The outputs of the envelope detectors form inputs to the decoding means 226 and to the frequency adjust processor 224. The output of the frequency adjust processor is in turn coupled to an input of each of the tunable band pass filters 208, 210, 212, and 214. The reader 200 preferably detects the resonant frequencies of the RF tag resonant circuits by detecting absorption of the RF energy by the resonant circuits. The tunable band pass filters 208, 210, 212, and 214 tune the reader to each of the resonant frequencies of the tags and the envelope detectors 216, 218, 220, and 222 detect for the absorption of the RF energy by the RF tags. The decoding means 226 preferably includes a decoding processor and parallel-to-serial converter which determines from the outputs of the envelope detectors 216, 218, 220, and 222 the resonant frequencies of the RF tags recovering the identification codes of the RF tags which are outputted by the parallel-to-serial converter at an output 228.

Figure 14:
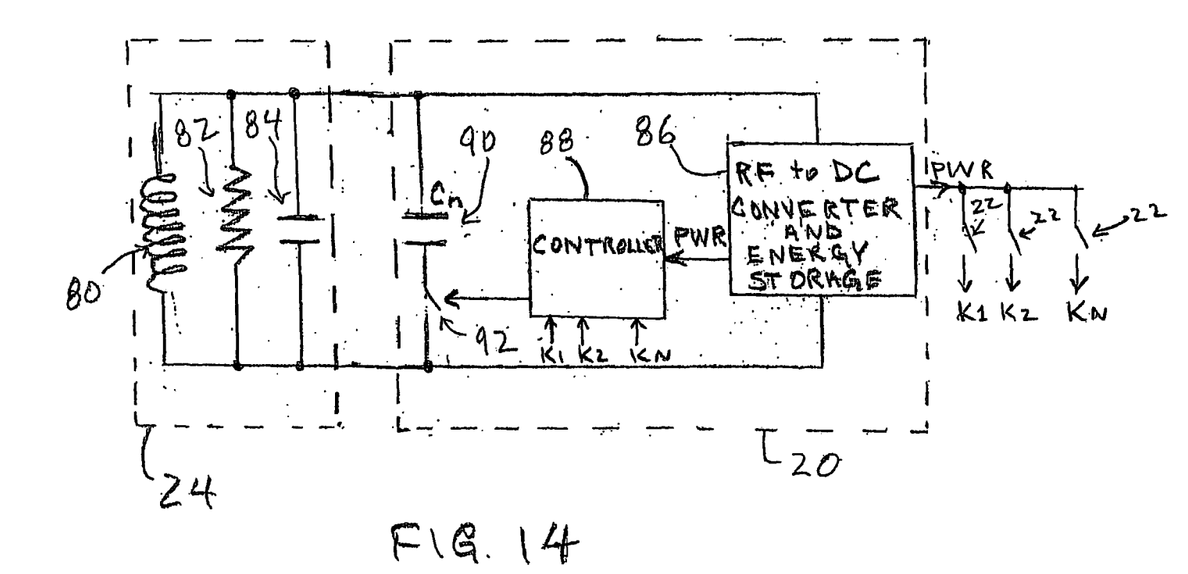
FIG. 14 is a block schematic diagram of another specific embodiment of a tag.

FIG. 14 is a block schematic diagram of another specific embodiment of the tag where tag circuitry may be shared for plural keys. The illustrated circuit is adapted for an inductive tag and reader embodiment but such combined tag circuitry may also be employed for electrostatic coupling. As illustrated, tag antenna 24 includes an inductor 80 and has an associated reactance illustrated as resistor 82 and capacitor 84. Tag 20 includes a rectifier and power supply circuit (RF to DC converter and energy storage circuit) 86 which supplies power to controller 88 and to key activated switches 22 along line 94. Controller 88 includes a memory storing the unique code for each key. Capacitor 90 has a capacitance Cn which tunes the tag to resonate at a desired frequency fn. In response to a switch 22 closing, the corresponding input 96 to controller 88 goes high (or low if the closing of the switch couples the input to ground). Controller 88 decodes the memory location for the depressed key and modulates switch 92 to encode the data for the unique key code for that key. The modulation may take the form of coupling and decoupling the capacitor 90 to tune and detune the circuit at a high rate. Alternatively, the switch 92 may take the form of a varactor and controller 88 may control the capacitance thereof to modulate the resonant frequency of the tag to encode the tag code, as described in the '447 patent (see, e.g., FIG. 16 thereof). Any other known modulation technique may also be employed. Also, as known in the art backscatter or reader load modulation may be employed to transmit the data to the reader. A separate tag circuit 20 may be provided for each set of keys which are simultaneously activated. Therefore, for example, four of the tag circuits 20 illustrated in FIG. 14 may be provided with one circuit provided for each of Ctrl, Alt, and Shift keys and one circuit coupled to all the text keys. Also, separate antennas 24 may be provided for each of these separate tags, as shown in FIG. 9.

Figure 15:
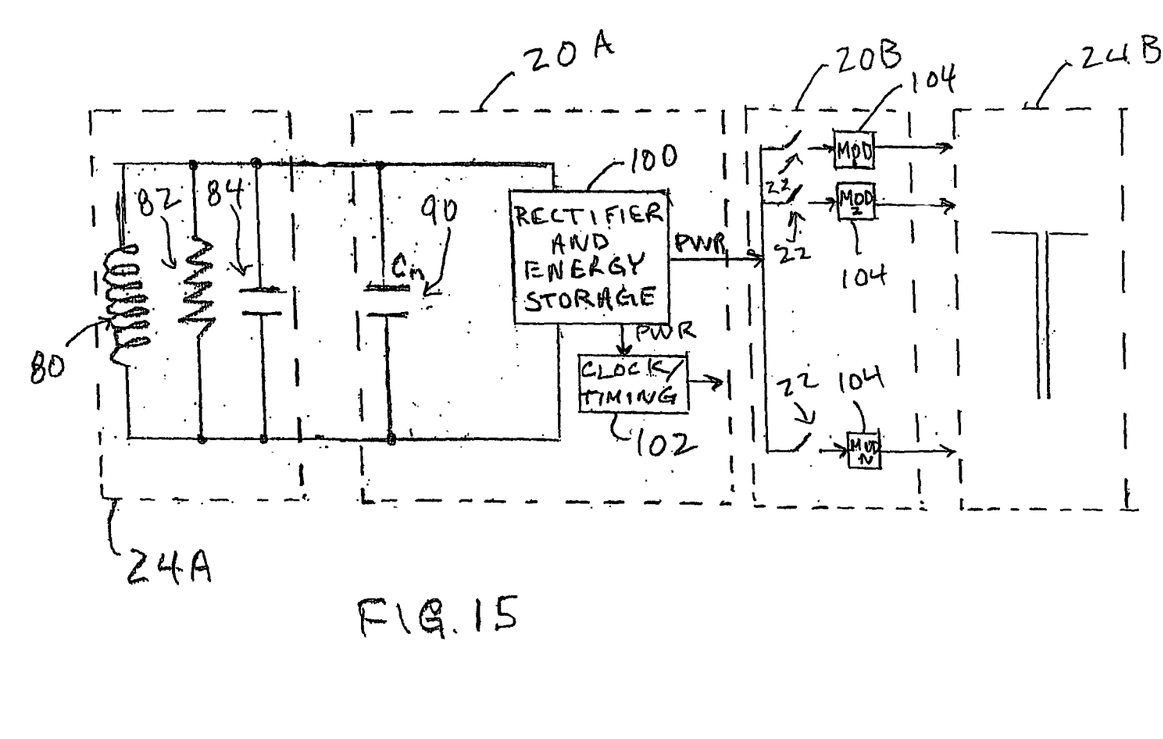
FIG. 15 is a block schematic diagram of a specific embodiment of the tag circuitry and antenna adapted for an embodiment with separate tag antennas provided for power supply and data transmission.

FIG. 15 is a block schematic diagram of a specific embodiment of the tag circuitry and antenna adapted for an embodiment with separate tag antennas provided for power supply and data transmission. This embodiment may thus employ a plural antenna layout on the keyboard such as illustrated in FIG. 9. Since the tag antenna performs two roles in the system, power supply and data transmission, the optimal design of the antenna may differ for the two roles. The illustrated embodiment allows the two antennas to be separately optimized. Therefore this embodiment may improve read range for some applications. Also, this may reduce detuning or inter key interference, depending on the approach adopted to such interference.

Referring to FIG. 15, a power supply tag antenna 24A is shown coupled to a tag power supply circuit 20A. Power supply tag antenna 24A is illustrated as an inductive coil 80 with an associated reactance as described in previous embodiments. Other antenna designs may be employed, however, including an electrostatic coupling antenna design such as described previously. To maximize power supply coupling, antenna 24A may occupy a substantial portion of the keyboard area and various layouts on the keyboard may be employed as will be appreciated from the previously described embodiments. Tag power supply circuit 20A includes tuning capacitor 90 and a rectifier and power storage and supply circuit 100. Since the antenna 24A is not coupled directly to switches 22, capacitor 90 is not switched, which allows antenna 24A to collect power continuously while the antenna 24A is in the range of the field 16. Therefore a longer power collection time may be provided and even very weak fields may provide adequate power in a time scale not normally tolerable in typical transponder tag applications. As a result read range may be increased. Also, longer available charge times may cumulatively allow a larger storage capacity and larger stored energy to be possible. Tag circuit 20A may also include a clock recovery circuit 102. Clock recovery circuit 102 may also determine a timing signal or code which enables multi-function type keys to be assigned a unique time slot to avoid confusing the tag reader, as will be discussed in more detail below. The power supply from power storage and supply circuit 100 is provided to tag circuitry 20B comprising modulator circuits 104 via switches 22 which are activated by the keys of the keyboard as described above. Modulator circuits 104 in turn are coupled to the transmit tag antenna 24B. Modulator circuits include a memory storing a unique key code for the corresponding key and a controller for modulating antenna 24B with the code. Antenna 24B may be optimized for the transmission of the data back to the reader. For example, antenna 24B may transmit data via backscatter modulation and may be optimized therefore. For example, antenna 24B may be a half wavelength dipole antenna configured over a substantial portion of the keyboard to provide a strong reflected signal. Plural antennas 24B may also be provided each respectively coupled to one or more circuits 104. Plural antennas 24B may also be provided each respectively having a different orientation to reduce sensitivity to keyboard orientation. Also, other antenna designs may be employed, e.g., a bowtie antenna, multi-element half wavelength dipole, or folded dipole antenna design may be employed. Various modulator circuit designs and approaches are known; for example, in addition to the previously mentioned teachings the teachings of U.S. Pat. No. 6,243,012 may be employed, the disclosure of which is incorporated herein by reference.

Figure 16:
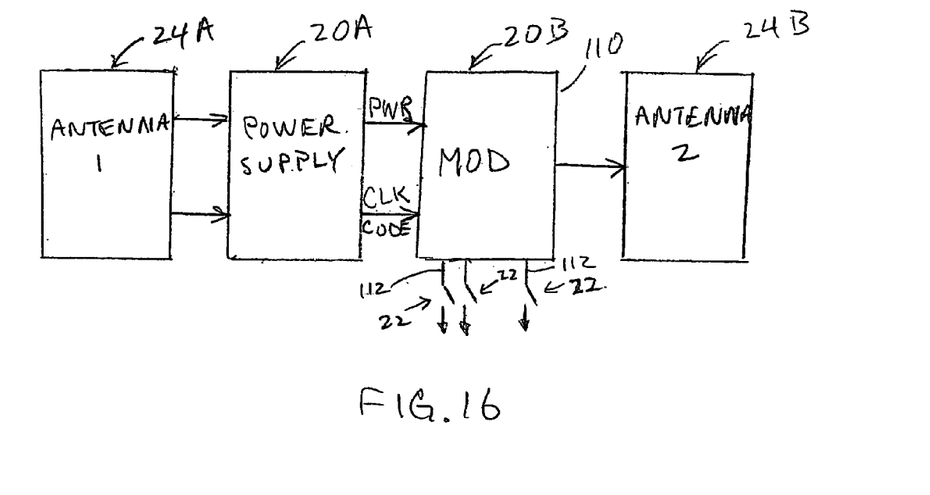
FIG. 16 is a block schematic diagram of a specific embodiment of the tag circuitry and antenna adapted for another embodiment with separate tag antennas provided for power supply and data transmission.

FIG. 16 is a block schematic diagram of a specific embodiment of the tag circuitry and antenna adapted for another embodiment with separate tag antennas provided for power supply and data transmission. The embodiment of FIG. 16 corresponds generally to that of FIG. 15 and like numerals are employed. The embodiment of FIG. 16 differs in that plural keys 22, and associated keys, are coupled to a single modulator circuit 110 via inputs 112. Modulator 110 includes a memory storing modulation codes for each such key and modulates the antenna with the appropriate code in response to the respective switch 22 closing. The modulator 110 may also receive a timing signal and/or a code from tag circuit 20A, which may be used to allocate a unique time slot to otherwise simultaneously activated keys, as will be described in relation to FIG. 17. Also, plural modulators 110 may be provided with different modulators coupled to different groups of keys and/or to different antennas 24B.

Figure 17:
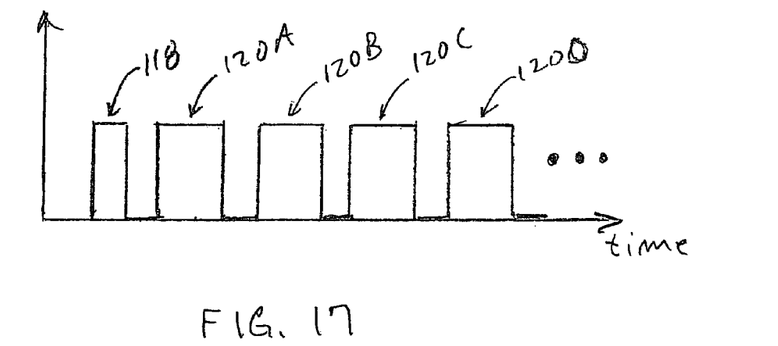
FIG. 17 is a timing diagram illustrating the use of unique time slots for simultaneously activated keys.

FIG. 17 is a timing diagram illustrating the use of unique time slots 120 for simultaneously activated keys. The pattern illustrated may comprise a timing signal derived by a tag circuit, such as modulators 104 or 110 described above, from a clock signal from clock recovery circuit 102 or other timing circuit. The modulator will then enable modulation of a code for a given key type only when the timing measured from a reference signal 118 is within slot 120. Alternatively, each time slot may represent a different code with a key type enabled only when the corresponding code is provided by the timing circuit. Thus, for example, slot or code 120A may enable a first multi-function key (e.g., Ctrl), 120B may enable a second multi-function key (e.g., Shift), 120C may enable a third multi-function key (e.g., Alt), and 120D may enable the alpha numeric keys (e.g., in a QWERTY keyboard).

Figure 18:
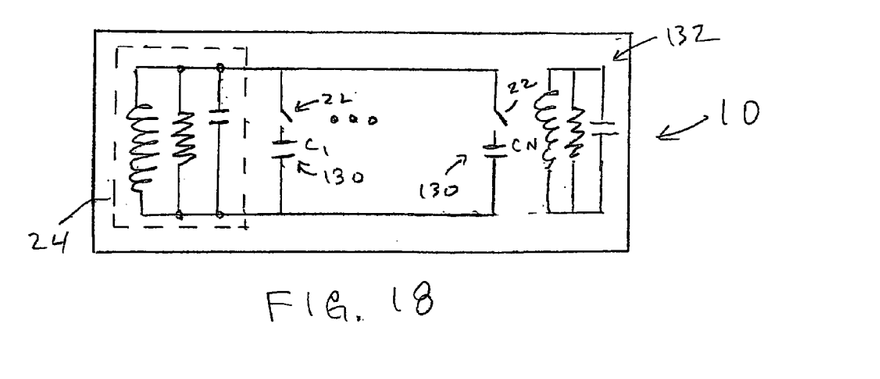
FIG. 18 is a schematic diagram of an embodiment of the tag circuitry adapted for key activated tuning/detuning of the circuit.

FIG. 18 is a schematic diagram of an embodiment of the tag circuitry adapted for key activated tuning/detuning of the circuit. FIG. 18 is adapted to couple capacitors 130 into and out of a tuned circuit in response to key activation and closing of corresponding switches 22. Each key thus corresponds to a unique frequency for the circuit which can be detected by backscatter or load variation in a multi-frequency reader. For example, a reader such as described in relation to FIG. 13 may detect a number of separate frequencies allowing discrimination of a plurality of keys without the need to draw power from the interrogating field 16. This can significantly increase read range, especially for backscatter detection, and reduce costs associated with modulator tag circuitry. However, noise susceptibility is increased. To alleviate this problem a normalizing circuit 132 may be provided which is always active at the same time but at a different frequency on a matching reference level to help distinguish the key data from noise levels.

It will be appreciated from the foregoing that the above described embodiments are purely illustrative examples and a variety of different implementations of both the system employing the keyboard, the reader and the keyboard itself are possible. For example, with respect to the overall system, depending on the keyboard read range of the system as implemented, the system employing the keyboard may also comprise an entertainment system as described in the above noted '156 patent, incorporated herein by reference, with the keyboard providing control input functions as described therein. Also, a variety of computing devices such as so called internet appliances and other desktop systems may employ the invention. Variations in the reader and keyboard in turn are too numerous to describe in detail including a variety of different combinations of transmission schemes, antenna designs, modulation schemes, frequency ranges, etc.

What is claimed is:

1. A method for short range wireless transmission between a receiver and an input device, comprising:
    transmitting an interrogating field to the input device;
    the input device having a tuned circuit comprised only of passive components that responds to the interrogation field by emitting a characteristic frequency;
    employing a plurality of switches to each couple a passive circuit element with a unique value to the tuned circuit when the switch is actuated to change the characteristic frequency of the tuned circuit;
    transmitting a backscatter return field to the receiver, employing a backscatter antenna coupled to the tuned circuit in the input device and coupled to the interrogating field; and
    detecting the backscatter return field at the receiver to determine the switch actuated by the changed characteristic frequency from the tuned circuit.

2. A method for short range wireless transmission as in claim 1, wherein the antenna is dimensioned on the order of the magnitude of the wavelength of the interrogating field.

3. A method for short range wireless transmission as in claim 1, wherein the receiver is configured in an entertainment system.

4. A method for short range wireless transmission as in claim 1, wherein the receiver is configured in a computer.

5. A method for short range wireless transmission as in claim 1, wherein the input device comprises plural inputs coupled to the switches and wherein selective activation thereof couples different passive circuit elements to alter the characteristic reflected signal for each input.

6. An input device for determining switch activations, comprising:
    an interrogator transmitting an interrogation field;
    a tuned circuit comprised only of passive components that responds to the interrogation field by emitting a characteristic frequency;
    a plurality of switches each coupling a passive circuit element with a unique value to the tuned circuit when the switch is actuated to change the characteristic frequency of the tuned circuit;
    a backscatter antenna coupled to the tuned circuit and the interrogation field to generate a return field; and
    a reader that detects the backscatter return field from the antenna to determine the switch actuated by the changed characteristic frequency from the tuned circuit.

7. An input device as in claim 6, wherein the antenna is dimensioned on the order of the magnitude of the wavelength of the interrogating field.

8. An input device as in claim 6, further comprising a second tuned circuit which is tuned to a different characteristic frequency and wherein the reader also detects a return field at the different characteristic frequency.

* * * * *